United States Patent
Fuller et al.

(10) Patent No.: US 7,841,411 B2
(45) Date of Patent: Nov. 30, 2010

(54) USE OF POLYIMIDES IN TREATING SUBTERRANEAN FORMATIONS

(75) Inventors: Michael J. Fuller, Houston, TX (US); John W. Still, Richmond, TX (US)

(73) Assignee: Schlumberger Technology Corporation, Sugarland, TX (US)

( * ) Notice: Subject to any disclaimer, the term of this patent is extended or adjusted under 35 U.S.C. 154(b) by 183 days.

(21) Appl. No.: 11/956,928

(22) Filed: Dec. 14, 2007

(65) Prior Publication Data
US 2009/0151944 A1 Jun. 18, 2009

(51) Int. Cl.
*E21B 43/22* (2006.01)
*E21B 43/267* (2006.01)

(52) U.S. Cl. .............. 166/300; 166/279; 166/280.2; 166/281; 166/308.3

(58) Field of Classification Search ............. None
See application file for complete search history.

(56) References Cited

U.S. PATENT DOCUMENTS

| | | | |
|---|---|---|---|
| 4,090,563 A | 5/1978 | Lybarger et al. | |
| 4,646,835 A | 3/1987 | Watkins | |
| 5,160,642 A * | 11/1992 | Schield et al. | ............ 507/222 |
| 5,658,464 A | 8/1997 | Hann | |
| 6,436,880 B1 | 8/2002 | Frenier | |
| 6,506,711 B1 | 1/2003 | Shuchart | |
| 6,531,427 B1 | 3/2003 | Shuchart | |
| 6,806,236 B2 | 10/2004 | Frenier | |
| 6,986,852 B2 | 1/2006 | Sicius | |
| 7,000,702 B2 | 2/2006 | Hanes, Jr. | |
| 7,013,974 B2 | 3/2006 | Hanes, Jr. | |
| 7,091,160 B2 | 8/2006 | Dao | |
| 7,166,560 B2 | 1/2007 | Still | |
| 7,192,908 B2 | 3/2007 | Frenier | |
| 7,299,870 B2 | 11/2007 | Garcia-Lopez De Victoria et al. | |
| 2003/0150613 A1 | 8/2003 | Freiter | |
| 2005/0137095 A1 | 6/2005 | Cawiezel | |
| 2005/0194139 A1 | 9/2005 | Hanes et al. | |
| 2006/0118302 A1 | 6/2006 | Fuller | |
| 2006/0131022 A1 | 6/2006 | Rae et al. | |
| 2006/0144592 A1 | 7/2006 | Hanes et al. | |
| 2006/0148658 A1 | 7/2006 | Hanes et al. | |
| 2008/0139416 A1* | 6/2008 | Rimassa et al. | ............ 507/241 |

FOREIGN PATENT DOCUMENTS

WO 2006075154 A 7/2006

* cited by examiner

*Primary Examiner*—Zakiya W. Bates
(74) *Attorney, Agent, or Firm*—Martin Rzaniak; David Cate; Robin Nava (57) ABSTRACT

A method of treating a subterranean formation penetrated by a wellbore is carried out by forming a treatment fluid comprising an aqueous carrier fluid and a solid-form polyimide homopolymer or copolymer capable of hydrolyzing to form polycarboxylates and/or polycarboxylic acids. The treatment fluid is introduced into the formation through the wellbore. In another method, a treatment fluid comprising an aqueous carrier fluid, a solid-form polysuccinimide homopolymer or copolymer and at least one of a viscosifying agent, proppant and an acid capable of dissolving materials of the formation is formed. This is introduced into the formation through the wellbore. A method of treating a sandstone-containing formation penetrated by a wellbore may also be carried out by forming a treatment fluid comprising an aqueous solution containing a hydrogen fluoride source, ammonium hydroxide and at least one of a polyimide and a polycarboxylate, which is introduced into the formation through the wellbore.

22 Claims, 5 Drawing Sheets

USE OF POLYIMIDES IN TREATING SUBTERRANEAN FORMATIONS

BACKGROUND

Various types of fluids are used in operations related to the development and completion of wells that penetrate subterranean formations, and to the production of gaseous and liquid hydrocarbons from natural reservoirs in such wells. These operations include perforating subterranean formations, fracturing subterranean formations, modifying the permeability of subterranean formations, or controlling the production of sand or water from subterranean formations. The fluids employed in these oilfield operations may include drilling fluids, completion fluids, work-over fluids, packer fluids, fracturing fluids, stimulation fluids, conformance or permeability control fluids, consolidation fluids, and the like.

Hydraulic fracturing is one stimulation technique that is routinely performed on oil and gas wells to increase fluid production from subterranean reservoirs. Specially engineered fluids are pumped at high pressures and rates into the reservoir to be treated, causing fractures in the formation matrix to open. Proppants, such as ceramic beads or grains of sand, are carried within the fracturing fluid to keep the fracture open once the treatment is completed.

Matrix acidizing and acid fracturing are also techniques commonly used in order to stimulate the production or injectivity from wells that either produce hydrocarbons or are used for water injection. Acidizing of carbonate formations is typically carried out using hydrochloric, formic, or acetic acid in dilute aqueous solution with a number of other additives, such as those for corrosion inhibition, wettability alteration, etc. In sandstone formations, acidizing is usually carried out using solutions of hydrofluoric acid mixed typically with hydrochloric, acetic, formic, or a number of other organic acids. The chemistry of these fluids is more challenging because the sandstone formations being treated call for more aggressive solutions, due to the damage from aluminosilicate clays and drilling damage, and less-damaging fluids. This makes treating sandstone formations more difficult due to the complicated mineralogies and challenging temperatures.

One of the primary challenges in development of acidizing fluids for both carbonate and sandstone is the achievement of homogeneous placement of acid across formations with high permeability-heterogeneity across the productive interval. A number of techniques have been used to achieve improved acid diversion, including mechanical techniques, such as those employing packers and frac baffles, internal diverters that include chemicals that invade the porous rock matrix and generate temporary damage, and external particulate diverters. External particle-diverters have included rock salt, oil-soluble resins, and a number of other solids that degrade into water or oil-soluble materials.

Degradable polymers, such as those described in U.S. Pat. No. 7,166,560, have found use recently for acid-fracturing of carbonate formations, which hydrolyze to form soluble acids when exposed to temperatures typically encountered downhole. However, other degradable polymers are highly-sought after for matrix acid diversion, fluid-loss control in hydraulic fracturing and acid-fracturing applications, in addition to a wide variety of other applications that could benefit from degradable solids.

Scale deposition is a persistent problem that occurs in producing wells. Protecting wells from scale deposition is commonly accomplished by "squeezing" scale inhibitors into the formation matrix. This process is usually conducted as a separate step or treatment from stimulation or other treatments of the formation that typically requires the well to be shut in for a period of time. Reducing the number of scale treatments required to maintain productivity is therefore important.

Accordingly, a need exists for new treatment methods and fluids for treating subterranean formations in oil and gas wells that can combine in non-scale-inhibitor treatments a means for inhibiting or removing scale without requiring a separate scale inhibitor treatment.

BRIEF DESCRIPTION OF THE DRAWINGS

For a more complete understanding of the present invention, and the advantages thereof, reference is now made to the following descriptions taken in conjunction with the accompanying figures, in which.

SUMMARY

A method of treating a subterranean formation penetrated by a wellbore is carried out by forming a treatment fluid comprising an aqueous carrier fluid and a solid-form polyimide homopolymer or copolymer capable of hydrolyzing to form polycarboxylates and/or polycarboxylic acids. The treatment fluid is introduced into the formation through the wellbore. In certain embodiments, the treatment fluid may contain a proppant and may include a viscosifying agent. In some embodiments, the treatment fluid may further contain a formation-dissolving agent capable of dissolving materials of the formation. At least one of the treatment fluid and a post-flush fluid introduced after the treatment fluid may have a pH of about 4 or more in some applications.

The polyimide may be a homopolymer or copolymer with all or a portion of such homopolymer or copolymer selected from at least one of polysuccinimide, polymaleimide, poly(aspartic acid), polyaspartate, poly(amino acids), poly(ethylene glycol), poly(propylene glycol), and N-derivatized polyaspartamide, and wherein the copolymer includes block or random copolymers with portions of at least two of the monomer units of succinimide, maleimide, aspartate, aspartic acid, glutamic acid, asparagine, glutamine, lysine, arginine, alanine, valine, serine, threonine, and other amino acids and their salts thereof. The solid-form polyimide may be in the form of at least one of particles, fibers, beads, films, ribbons, rods, elongated bodies and platelets.

In carrying out the method, the treatment fluid may be introduced into the formation at a pressure above the fracture pressure of the formation to facilitate formation fracturing. In another method, the treatment fluid is introduced below the fracture pressure.

In another application, a treatment fluid comprising an aqueous carrier fluid, a solid-form polysuccinimide homopolymer or copolymer and at least one of a viscosifying agent, proppant and an acid capable of dissolving materials of the formation is formed. This is introduced into the formation through the wellbore.

A method of treating a sandstone-containing formation penetrated by a wellbore may also be carried out by forming a treatment fluid comprising an aqueous solution containing a hydrogen fluoride source, ammonium hydroxide and at least one of a polyimide and a polycarboxylate, which is introduced into the formation through the wellbore.

DETAILED DESCRIPTION OF THE EMBODIMENTS

The present invention makes use of certain polymers for treating subterranean formations of oil and gas wells. In particular, the polymers are polyimides that may be initially in solid form and are generally water insoluble or have low solubility in water. Under appropriate conditions, the polyimides will slowly hydrolyze in water to form polycarboxylic acid or polycarboxylate.

In the case of homopolymers or copolymers with units based on polysuccinimide, for example, the succinimide units hydrolyze to form polyaspartate units. The rate of this hydrolysis reaction is affected by and increases with increased surface area, increasing pH (beginning with pH>4), increased agitation, increased temperature, and the presence of metal ions in solution. In the case of polysuccinimide starting material, the resulting polyaspartate may biodegrade into its monomer acids through hydrolysis of the amide bonds in the polymer backbone.

Polycarboxylates refer to a family of compounds currently used in scale inhibition wherein the polycarboxylate is introduced into the formation through a "squeeze" operation, which is a separate treatment that is specifically conducted to introduce the scale inhibitor into the formation. In such operations, the polycarboxylate is pumped into a subterranean formation. The polycarboxylate attaches to the matrix surfaces or other downhole surfaces by chemical adhesion and inhibits the formation or precipitation of scale, such as barium sulfate, calcium sulfate, calcium carbonate, strontium sulfate, iron sulfide, iron oxides, iron carbonate, tin oxides, aluminum oxides, zinc oxides, etc.

The polycarboxylic acid or polycarboxylates are water soluble and those derivatives bearing amide linkages in the backbone, including polyaspartate homopolymers and copolymers as well as other poly(amino acids), may further react to form monomeric acids under certain conditions, including exposure to high-pH or high-temperatures. An example of a polyimide that undergoes such reactions is polysuccinimide, which undergoes the following reactions illustrated in Equation (1) below:

(1)

X = K, Na, NH$_4$

As shown above, polysuccinimide (A) undergoes initial hydrolysis in water to form poly(aspartic acid) (B). Poly (aspartic acid) undergoes base-catalyzed hydrolysis to form a polyaspartate derivative (C), which may undergo further degradation, such as at high pH conditions, wherein hydrolysis of the imide linkages in the polymer backbone results in the formation of monomeric amino acids. In the case of X=H, the amino acid constitutes aspartic acid (D).

Although polysuccinimide is particularly well suited for treating subterranean formations in accordance with the present invention, other polyimides and copolymer derivatives may also be used alone or as a mixture with polysuccinimide and other different polyimides. Other polyimides may include polymaleimide, and a number of poly(amino acid) derivatives. Because polymaleimide is a polyolefin and not a poly(amino acid), however, it does not undergo the final step of hydrolysis to monomers through biodegradation, as does polysuccinimide.

Because of its suitability for use in the treatment of subterranean formations, reference throughout this description may be made specifically to polysuccinimide and its degradation products. It should be understood, however, that other polyimides and copolymers with units of polysuccinimide may be used as well. Therefore, unless it is apparent from its context, when polysuccinimide and copolymers or their degradation products are discussed, it may be alternatively read to include other polyimides and copolymers and their degradation products and mixtures thereof. Conversely, when polyimide or its degradation products are discussed, this may also be alternatively read to include polysuccinimide or its degradation or partial-degradation products and mixtures thereof.

The polysuccinimide may be a homopolymer or a copolymer that includes polysuccinimide and portions of aspartic acid or aspartate salts and other amino acid monomers. Copolymers may include partially-hydrolyzed polysuccinimide (with portions of polysuccinimide and polyaspartate or poly(aspartic acid) in the backbone). Copolymers may also include block or random copolymers with portions of at least two of the following monomer units: succinimide, maleimide, aspartate, aspartic acid, glutamic acid, asparagine, glutamine, lysine, arginine, alanine, valine, serine, threonine, and other amino acids and their salts thereof. Copolymers may also include aspartamide derivatives, formed from the reactions of amine compounds with individual carboxylate groups of the polycarboxylate such as polyaspartate or through ring-opening reactions of amines with succinimide groups. Examples of these reactions may include grafting hydrophilic poly(ethylene glycol) or poly(propylene glycol) oligomers or similar derivatives to the polyimide backbone from reactions with PEG-NH$_2$ (such as the reactions described in W. Chen et al./Colloids and Surfaces A: Physicochem. Eng. Aspects 278 (2006) 60-66.).

Derivatization of the polysuccinimide polymers may also include hydrophobic modifications, such as formation of N-alkylaspartamides from the reactions of alkyl amines with polysuccinimide, such as the ring-opening reaction of dodecylamine with polysuccinimide to form N-dodecylaspartamides groups on the backbone (as carried out in H. Chen et al./Polymer 46 (2005) 1821-1827).

Although the molecular weight of the polyimide or polysuccinimide may vary, those having a molecular weight of from about 500 g/mol to about 10,000 g/mol, more particularly from about 1000 g/mol to about 5000 g/mol, and still more particularly from about 2000 g/mol to about 4500 g/mol may be suitable. An example of a commercially available polysuccinimide is that marketed as BAYPURE® DSP, available from Lanxess Corporation.

The polyimides or polysuccinimides may be used in treatment fluids for treating subterranean formations without the use of any phosphonates, such as inorganic phosphate, or fatty acids or derivatives of fatty acids. If such materials are present, they may be in insubstantial amounts that do not affect the performance of the polyimide.

It should be noted that the description and examples are presented solely for the purpose of illustrating the embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that any concentration or value listed or described as being useful, suitable, or the like, is intended that any and every concentration or value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that the inventors appreciate and understand that any and all data points within the range are to be considered to have been specified, and that the inventors are in possession of the entire range and all points within the range.

The polyimide or polysuccinimide may initially be in a solid form. The polyimide may be in the form of particles of various sizes. The polyimide may also be formed into fibers, beads, films, ribbons, platelets, rods, elongated bodies or similar high-aspect-ratio shapes or other shapes. The polymers may be melt processed, mechanically-ground, cryo-ground, or blasted with abrasive particulates to provide the desired shape and size particle. The use of binders may also be employed to facilitate formation of the solid shapes. If binders are used, they may be present in an amount of from about 0.5 to about 10% by total weight of the bound particle.

Various treatments of subterranean formations can be carried out using the polyimides or polysuccinimides in accordance with the invention. In particular, the polyimides may be used in conjunction with a non-scale inhibitor stimulation treatment, such as a matrix stimulation, hydraulic fracturing, or acid fracturing treatment, but wherein the product of polyimide hydrolysis, which may include polyaspartate derivatives, may provide scale inhibition in conjunction with the matrix or formation treatment, and may include other non-scale inhibition effects, as are discussed herein, which may be beneficial.

Thus, in one particular application the polyimide or polysuccinimide-derivative particles are placed along with a conventional proppant in a non-acid fracturing application in reservoirs that experience scale in the matrix or proppant pack, to act as a delayed release scale inhibitor. In this case, smaller amounts and particle sizes for the polyimide or polysuccinimide may be used than the proppant-sized particles used for acid fracturing. As an example, the particle sizes may be from about 0.15 mm or less, with from about 0.5 micron to about 0.1 mm being more typical. Larger size particles, including proppant-size particles, may also be used.

The amount of polyimide or polysuccinimide used in a scale-inhibiting fracturing application may be from about 10% by weight or less of the treatment fluid, with from about 0.2 to about 5% by weight being more typical. When used solely for scale-inhibition purposes, the polyimide or polysuccinimide may be used in lower quantities compared to other applications, such as in acid fracturing as discussed later on, because low amounts of scale inhibitor can produce a dramatic scale inhibition effect.

The treatment fluid used for the non-acid fracturing application is typically a viscosified or gelled fluid. The viscosifiers that may be used include the polymers or viscoelastic surfactants typically used in fracturing, frac-packing and gravel packing. In order to provide higher viscosity to the aqueous fracturing fluids, water soluble or hydratable polymers are often added to the fluid. These hydratable polymers are typically crosslinked using crosslinking agents to provide a gelled polymer network that increases the viscosity of the fluid to a desired fluid viscosity, although some fracturing fluids contain only the linear polymer without crosslinker added. In other cases, associative viscosification is achieved with suitable polymers and surfactant mixtures.

The hydratable polymers useful in the present invention may include any hydratable polymers familiar to those in the well service industry that are water soluble, and when used solely with the polyimide as the acid source, may be adjusted to a high pH. Examples of suitable hydratable polymers include, but are not necessarily limited to, guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG), galactomannan gums, glucomannan gums, guars, derived guars and cellulose derivatives. Cellulose derivatives such as hydroxyethylcellulose (HEC), carboxymethylcellulose (CMC), hydroxypropylcellulose (HPC) and carboxymethylhydroxyethylcellulose (CMHEC) may also be used. Also, synthetic polymers containing acrylamide are useful, including polyacrylamides, partially hydrolyzed polyacrylamides, copolymers of acrylamide and acrylic acid and copolymers and terpolymers containing acrylamide, vinyl pyrollidone, AMPS (2-Acrylamido-2-Methyl Propane Sulfonic Acid, or acrylic acid. The viscosifying agent may be heteropolysaccharide viscosifying agent. Heteropolysaccharides such as xanthan gum and those disclosed in U.S. Patent Publication Nos. US2006/0166836, published Jul. 27, 2006, and US2007/0042913, published Feb. 22, 2007, which are each herein incorporated by reference, may be used.

The hydratable polymer may be added in various concentrations to provide the desired viscosity. Concentrations of up to about 1% by weight of total weight of the treatment composition may be used. In certain embodiments of the invention the hydratable polymer may be used in an amount of from about 0.05% to about 0.5% by total weight of the composition.

The polymers may be capable of being crosslinked with any suitable crosslinking agent, such as metal ion crosslinking agents. Examples of such materials include the polyvalent metal ions of boron, aluminum, antimony, zirconium, titanium, etc., that react with the polymers to form a composition with adequate and targeted viscosity properties for particular operations. The crosslinking agent may be added in an amount that results in suitable viscosity and stability of the gel at the temperature of use. Typically, crosslinkers are added at concentrations of about 5 to about 500 parts per million (ppm) of active atomic weight. That concentration can be adjusted based on the polymer concentration.

The crosslinker may be added as a solution and may include a delaying agent that delays the crosslinking reaction. This delay may be beneficial in that the high viscosity fracturing fluid is not formed until near the bottom of the wellbore to minimize frictional pressure losses and may prevent irreversible shear degradation of the gel, such as when Zr or Ti crosslinking agents are used. Delayed crosslinking may be time, temperature or both time and temperature controlled. The delaying agents may include those materials which provide a chelating effect on the crosslinking agent, thus limiting to any extent, the crosslinker-polymer chemical interactions which otherwise provide increased viscosity properties. Polymer crosslinking consists of the attachment of two polymeric chains through the chemical association of such chains to a common element or chemical group. The delaying agent may be a ligand that effectively complexes with the crosslinker. Any suitable delaying agent known to those in the art may be used. Examples of suitable delaying agents include, but are not necessarily limited to, polyols, gluconates, sorbitols, mannitols, carbonates, or any mixtures thereof. A specific example of a suitable delaying agent is sodium gluconate. The delaying agent may be present in the amount of up to about 0.4% by weight of total composition weight, more particularly in the range of from about 0.02% to about 0.3% by weight of total composition weight, and more particularly from about 0.02% to about 0.2% by weight of total composition weight. The delaying agent may be added as a solid, or added as a separate liquid stream or premixed in water to form the treatment composition.

The polymer-viscosified fluid may also include a breaker. The purpose of this component is to "break" or diminish the viscosity of the fluid so that this fluid is more easily recovered from the formation during cleanup. With regard to breaking down viscosity, oxidizers, enzymes, or acids may be used. Breakers reduce the gelling polymer's molecular weight by the action of an acid, an oxidizer, an enzyme, or some combination of these on the polymer itself. Additionally, the solid polyimide or polysuccinimide homopolymers, copolymers, or hydrolysis products (including polyaspartates) themselves may act as breakers for the viscosifier, thus enhancing cleanup and offsetting any damage that might be done by the viscosifier. Acids are known to damage or destroy synthetic polymers and biopolymers used to viscosity drilling, completion and stimulation fluids. Acids are also known to damage or destroy either the micelle/vesicle structures formed by viscoelastic surfactants or, in some cases, the surfactants themselves.

When incorporated, the polymer-based viscosifier, crosslinked or non-crosslinked, may have any suitable viscosity. The minimum viscosity may be that that is suitable to carry the proppant and polyimide or polysuccinimide particles within the fracturing environment. In certain embodiments, the viscosity may be from about 50 mPa-s or greater at a shear rate of about 100 $s^{-1}$ at treatment temperature, more particularly about 75 mPa-s or greater at a shear rate of about 100 $s^{-1}$, and even more particularly about 100 mPa-s or greater. Generally, the maximum viscosity is less than about 1000 mPa-s, more typically, less than about 600 mPa-s at a shear rate of about 100 $s^{-1}$. Higher viscosities may be avoided to minimize the cost and promote better clean-up of the fracturing fluid after the fracture has closed and the well is in the production phase.

A viscoelastic surfactant (VES) may also be used as a viscosifying agent for the fracturing fluid carrying proppant and the polyimide or polysuccinimide particles. The VES may be selected from the group consisting of cationic, anionic, zwitterionic, amphoteric, nonionic and combinations thereof. Some nonlimiting examples are those cited in U.S. Pat. No. 6,435,277 (Qu et al.) and U.S. Pat. No. 6,703,352 (Dahayanake et al.), each of which are incorporated herein by reference.

When a VES is used, the VES may range from about 0.2% to about 15% by weight of total weight of fluid, more typically from about 0.5% to about 15% by weight of total weight of fluid, and more typically from about 2% to about 10% by weight of total weight of fluid. Fluids incorporating VES based viscosifiers may have any suitable viscosity, however, viscosity values of less than about 100 mPa-s at a shear rate of about 100 $s^{-1}$ at treatment temperature are typical. More typical are those viscosities of less than about 75 mPa-s at a shear rate of about 100 $s^{-1}$, and even more typically are those of less than about 50 mPa-s at a shear rate of about 100 $s^{-1}$.

The proppants used in combination with the polyimide or polysuccinimide particles may be those that are substantially insoluble in the treatment solution and/or fluids of the formation. In fracturing operations, proppant particles carried by the treatment composition remain in the fracture created, thus propping open the fracture when the fracturing pressure is released and the well is put into production. The proppants may have a particle size of from about 0.15 mm to about 2.5 mm or more. Suitable proppant materials include, but are not limited to, sand, walnut shells, sintered bauxite, glass beads, ceramic materials, naturally occurring materials, or similar materials. Mixtures of proppants can be used as well. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of processing, etc.

The polyimide or polysuccinimide particles may also be used in combination with other soluble or degradable proppant materials, such as polylactic acid (PLA), polyglycolic acid (PGA) or poly(caprolactone), with or without nonsoluble proppant materials. The use of such degradable proppant materials is described, for instance, in U.S. Patent Publication No. US2004/0152601, which is herein incorporated by reference.

The concentration of proppant in the composition may be any concentration that is suitable for carrying out the particular treatment desired. For example, the proppant may be used in an amount up to about 3 kilograms of proppant added per liter of the composition. Also, any of the proppant particles may be coated with a resin or other material to potentially improve the strength, clustering ability, and flow back properties of the proppant.

In one application, the proppant may actually be coated with the polyimide or polysuccinimide material, much like resin coated proppants (RCP). The amounts of coating may be similar or those amounts required for treatment or similar to the amount of resins used in coating RCP. Additionally, such polyimide or polysuccinimide coated proppants may be used in combination with polyimide or polysuccinimide particles to provide the necessary amount for effective treatment.

In one embodiment wherein the polyimide is used in combination with proppant in a non-acid fracturing treatment, all or at least a portion of the polyimide or polysuccinimide may be in the form of fibers. Fibers are known to assist in the transport of the proppant particles, reducing or eliminating the need for viscosification.

In its initial state, the polyimide or polysuccinimide is water-insoluble. Over time, the polymer hydrolyzes into more water-soluble polycarboxylic acid or poly(aspartic acid) derivatives, which would then adhere to the matrix rock and to the conventional proppant materials providing scale inhibition in both locations. This material also has the added benefit of long-term biodegradation, making it environmentally friendly. An optional postflush, which may have a pH of about 4 or more or a neutral or high-pH or basic-pH fluid may also be injected as a final fluid stage to facilitate hydrolysis of the polyimide to form soluble aspartate scale-inhibitor or dissolved-amino-acids.

In another application the polyimide or polysuccinimide particles are placed in a hydraulic (non-acid) fracturing application as an additive to control or minimize fluid-loss to the formation. In this case, the amounts of the solid polyimide or polysuccinimide derivative may range from about 1 to about 40 pounds fluid-loss additive per-thousand-gallons fluid (about 0.57 kg/m$^3$ to about 22.8 kg/m$^3$), more particularly between about 5 to about 25 pounds fluid-loss additive per-thousand-gallons (about 2.85 kg/m$^3$ to about 14.3 kg/m$^3$). In certain embodiments, the particle sizes may be from about 0.15 mm or less, with from about 0.5 micron to about 0.1 mm being more typical. Larger size particles, including proppant-size particles, may also be used.

In certain embodiments using polyimide derivatives for fluid-loss-control, the polyimide or polysuccinimide may initially be in a solid form. The polyimide may be in the form of particles of various sizes. The polyimide may also be formed into fibers, beads, films, ribbons, platelets, rods, elongated bodies or similar high-aspect-ratio shapes or other shapes. The polymers may be melt processed, mechanically-ground, cryoground, or blasted with abrasive particulates to provide the desired shape and size particle.

Embodiments of the invention may further contain other additives and chemicals that are known to be commonly used in oilfield applications by those skilled in the art. These include, but are not necessarily limited to, materials such as surfactants, oxidative breakers, enzymatic breakers, demulsifiers, high temperature fluid stabilizers, oxygen scavengers, $H_2S$-scavengers, alcohols, corrosion inhibitors, fluid-loss additives, bactericides, biocides, clay stabilizers, and the like.

In another application the polyimides are used in delayed acid fracturing treatments of subterranean formations, particularly carbonate formations. Acid fracturing is a process in which an acidic fluid is injected into a formation at a pressure sufficiently high to fracture the rock. The acid then etches the surfaces of the fracture so that conductive flow paths are formed along the fracture faces that remain after the pressure is released and the fracture faces are forced back together.

There are potentially serious problems encountered with acid fracturing. First, acids, especially strong acids, react with the first material they encounter. In an acid fracturing treatment, as in matrix acidizing treatments, this means that as soon as a fracture forms or is enlarged, or as soon as a high permeability region is formed or encountered, both of which are likely to occur near the wellbore, acid will contact the fresh matrix surface near the wellbore, or in fluid contact with the high permeability region near the wellbore, and react with it. Most or all of the acid reaction then occurs near the wellbore, or in or near the high permeability region near the wellbore, and little or none of the acid reaches portions of the fracture farther from the wellbore, or farther away than the high permeability region. Therefore etched flow paths along the fracture faces are not formed very far away from the wellbore or beyond any high permeability regions. Second, once the acid begins to react with a portion of the matrix material, it tends to form "wormholes" or paths of least resistance that subsequent acid will follow. If either or both of these occurs, then when the pressure is released and the fracture closes, a satisfactory flow path for production of fluids from the formation into the fracture and into the wellbore will not be formed.

The use of solid-form polyimide or polysuccinimide particles facilitate solving these problems. Because the fluid containing the solid polyimide or polysuccinimide is not sufficiently acidic in certain embodiments when it is first injected, it will not react with the first formation material with which it comes into contact. Instead, it will be carried farther into the growing fracture where the acid that is subsequently formed during hydrolysis and degradation of the polyimide will subsequently react when it is released. Also, because the polyimide or polysuccinimide is a solid material, if it is large enough it will help prop open the fracture until the differential etching occurs. After it is hydrolyzed the polyimide or polysuccinimide will no longer be present and will not impede fluid flow from the formation into the wellbore for production. Additionally, the soluble polycarboxylic acids or poly(aspartic acids) will provide the added benefit of inhibiting scale.

Delayed acid fracturing with a solid-form polyimide or polysuccinimide in the fracturing fluid may be carried out in several ways. The solid polyimide or polysuccinimide may be included in an otherwise conventional acid fracturing treatment. The treatment fluid may contain an acid such as HCl, HF, an organic acid or mixtures thereof. The initially present acids will tend to spend in the near-wellbore or high permeability region of the formation, but the polyimide will be carried farther into the fracture and generate acid in situ that will etch the fracture faces farther from the wellbore. In applications with an acidic carrier fluid, an optional postflush of neutral or high-pH fluid may be injected as a final fluid stage to facilitate hydrolysis of polyimide to form soluble aspartate scale-inhibitor or dissolved-amino-acids. Such postflush fluids may be non-viscous fluids having a pH of from about 4 to about 12, more particularly from about 8 to about 12.

When the solid polyimide or polysuccinimide is used in a fracturing treatment in which it is the only source of acid, the fluid may have an initially neutral or generally basic pH, i.e. a pH >8. The pH for the fracturing fluid may be adjusted by adding appropriate amounts of a water-soluble base, such as sodium hydroxide (NaOH). Examples of other suitable bases include potassium hydroxide (KOH), ammonium hydroxide ($NH_4OH$), sodium hydroxide, tetramethylammonium hydroxide, soda ash, sodium bicarbonate, potassium carbonate, potassium bicarbonate, and similar bases. The base is typically used in an amount to provide an initial pH at the surface of from about 8 to about 11 of the treatment fluid.

In acid fracturing applications, the solid polyimide or polysuccinimide may also act as a proppant until it hydrolyzes. Normally proppant is typically not used in acid fracturing, although it can be, and such use would be within the scope of the present invention. In such applications, the polyimide or polysuccinimide particles are provided in particle sizes comparable to those of conventional proppants. The polyimide material may thus be formed into particles having a particle size of greater than 0.15 mm to about 2.5 mm or more, more particularly, but not limited to typical size ranges of from about 0.25 to about 0.43 mm, from about 0.43 to about 0.85 mm, from about 0.85 to about 1.18 mm, from about 1.18 to about 1.70 mm and from about 1.70 to about 2.36 mm. The particle sizes of the polyimide or polysuccinimide may be the same or different. Almost any particle size may be used. Governing factors for particle size selection may include a) the capability of equipment, b) the width of the fracture generated, and c) the desired rate and time of degradation. The rate of degradation can readily be measured in the laboratory in a given fluid at a given temperature for the particle size.

In acid fracturing applications, large amounts of the polyimide or polysuccinimide may be beneficial. The amount of solid polyimide or polysuccinimide used per unit area of fracture to be created depends upon, among other factors, the temperature and the amount of acid needed. A suitable concentration range for the polyimide or polysuccinimide particles may be between about 0.42 and about 5 ppg (between about 0.05 and about 0.6 kg/L), more particularly a suitable range may be between about 0.83 and about 2.5 ppg (between about 0.1 and about 0.3 kg/L).

In certain applications a non-soluble or inert proppant may also be used in combination with the polyimide or polysuccinimide used in such acid fracturing.

In performing the treatment, the treatment fluid containing the solid polyimide or polysuccinimide is pumped into the well at a pressure above the fracture pressure of the formation. At temperature and under neutral or basic pH conditions, the polysuccinimide hydrolyzes to the active carboxylic acid moieties and interacts with the surface of the rock. Such treatments may be conducted as lower-cost water fracs in which a low concentration, for example about 0.05 kg/L, of solid polyimide is pumped at a high rate, for example up to about 3500 L/min or more, with little or no viscosifier. They are also conducted, as are more conventional fracturing treatments, with viscosifiers and higher concentrations of particles, for example up to about 0.6 kg/L, of solid polyimide or polysuccinimide.

In treatment of a subterranean formation with the polyimide or polysuccinimide particles used as an acid fracturing application, the treatment fluid with the polyimide particles is introduced into the formation through the wellbore and may be shut-in. In this case, as previously discussed, the solid polyimide or polysuccinimide may act as a proppant and may be in the form of beads in the size range typically used for proppants in hydraulic fracturing. The lower density of the solid polyimide or polysuccinimide, relative to the density of conventional proppants, is typically an advantage since the amount of viscosifier needed may be less. When very large amounts of particles of solid polyimide or polysuccinimide are used, however, this may necessitate using a more viscous fluid than is usually used in conventional acid fracturing. The solid polyimide or polysuccinimide may also be used in combination with other degradable and non-degradable particles, such as PLA, PGA, poly(caprolactone) and inert proppants.

When the polyimide or polysuccinimide particles are used in acid fracturing, the solid polyimide or polysuccinimide may initially be inert to any other components of the fluids, so the other fluids may be prepared and used in the usual way. Any additives used in oilfield treatment fluids may also be included provided that they are compatible with, and do not interfere with the performance of the solid polyimide or polysuccinimide, if they are used, and vice versa. If the fluid contains a component (such as a viscosifier) that would affect or be affected by the solid polyimide or polysuccinimide, then either the amount or nature of the solid polyimide or polysuccinimide, or the amount or nature of the interfering or interfered-with component may be adjusted to compensate for the interaction. This may readily be determined by simple laboratory experiments.

In the presence of a neutral-pH or high-pH carrier fluid, over time, the polyimide or polysuccinimide degrades into water-soluble polycarboxylic acid or poly(aspartic acid). The water-soluble polycarboxylic acid also has the added benefit of scale inhibition, reducing the need for subsequent scale inhibition treatments. Eventually, the polycarboxylic acid degrades at high temperatures into monomeric amino acids which may heterogeneously etch the carbonate rock face.

In a further application, smaller or finely divided polyimide particles may be added to an aqueous acidizing fluid used to stimulate the formation matrix. In such applications, the treatment fluid is pumped or introduced into the formation at a pressure below the fracture pressure, with the acid dissolving minerals of the formation matrix to create flow channels or "wormholes" that facilitate production. One of the problems associated with such acidizing treatments is that the acidizing fluid tends to leak off or penetrate the more permeable zones, while leaving those less permeable areas where treatment is more desirable untreated or inadequately stimulated. To stimulate the low permeability zones, it is therefore necessary to divert the acid from high to low permeability zones. Similarly, when long enough intervals are treated with acid, diversion is needed to prevent a heterogeneous injection profile from resulting.

By providing polyimide or polysuccinimide particles in the formation-dissolving treatment fluid, a filter cake of the particles may be formed on the rock face. This facilitates the formation of a temporary barrier to flow in high-permeability areas so that the acid or formation-dissolving fluids can penetrate and stimulate the less permeable zones. The particle sizes for the polyimide or polysuccinimide when used as a diverting agent for formation-dissolving applications may be from about 0.15 mm or less, with from about 1 micron to about 0.1 mm being more typical. These smaller particles will then slowly hydrolyze to form polycarboxylic acids so that the particles are water soluble and no longer form a barrier to fluid flow. Additionally, the polycarboxylic acids, such as poly(aspartic acid), will adhere to the rock faces and serve as a scale inhibitor. The polycarboxylic acids will also biodegrade at high temperatures in to its monomeric acids.

The amount of polyimide or polysuccinimide particles used in this application will vary upon the job design. Typically, the particles are present within the treatment fluid in an amount of 10% or less by weight of the treatment fluid, more typically from about 0.2 to about 5% by weight of the treatment fluid. The polyimide or polysuccinimide used may also include copolymers of these materials and their degradation products, such as partially hydrolyzed polysuccinimide derivatives with some portion of polyaspartates being present.

In non-fracturing, acidizing applications, the acidizing fluid is one that is capable of dissolving at least portions of the formation. While this is typically an acid, other formation-dissolving agents may be used as well. Acidizing or formation-dissolving agents may include, for example, hydrochloric acid, formic acid, acetic acid, lactic acid, glycolic acid, sulfamic acid, phosphonate acids and esters thereof, malic acid, citric acid, tartaric acid, maleic acid, methylsulfamic acid, methanesulfonic acid, chloroacetic acid, aminopolycarboxylic acids, 3-hydroxypropionic acid, polyaminopolycarboxylic acids, for example hydroxyethylethylenediamine triacetic acid (HEDTA), ethylenediamine tetraacetic acid (EDTA), diethylenetriamine pentaacetic acid (DTPA), hydroxyethylimino diacetic acid (HEIDA), polycarboxylic acids, for example poly(acrylic acid) and poly(maleic acid), and salts of these acids and mixtures of these acids and/or salts. For sandstone treatment, the fluid also typically contains a hydrogen fluoride source. The hydrogen fluoride source may be HF itself or may be selected from ammonium fluoride and/or ammonium bifluoride or mixtures of these. When a strong acid is present, the HF source may also be one or more of polyvinylammonium fluoride, polyvinylpyridinium fluoride, pyridinium fluoride, imidazolium fluoride, sodium tetrafluoroborate, ammonium tetrafluoroborate, salts of hexafluoroantimony, TEFLON® synthetic resinous fluorine-containing polymer, and mixtures of these.

The formation-dissolving materials may be added at any concentration that allows the effective treatment of the formation to stimulate production of fluids from the matrix. Typically, the formation-dissolving material or acid is present in the treatment fluid in an amount of from about 1% to about 28% by weight of the treatment fluid.

When the formation-dissolving agent is a strong acid, the fluid may contain an acid-corrosion inhibitor, that those skilled in the art will recognize to be often based on quaternary ammonium or sulfur-based compounds.

The fluid optionally contains chelating agents for solution-sequestration of polyvalent cations, for example especially aluminum, calcium and iron (in which case the agents are often called iron sequestering or iron-control agents) to prevent their precipitation. Some of the formation-dissolving agents just described are such chelating agents as well.

Other additives that may be used with the polyimides as diverting agent include surfactants, oxidative breakers, enzymatic breakers, demulsifiers, high temperature fluid stabilizers, oxygen scavengers, $H_2S$-scavengers, alcohols, corrosion inhibitors, fluid-loss additives, bactericides, biocides, clay stabilizers, and the like.

In still another embodiment, the polyimide or polysuccinimide and/or a polycarboxylate is used in treating sandstone formations. These may be sandstone acidizing and sandstone acid fracturing treatments. Sandstone formations are typically comprised of quartz and clay components (e.g. 80% quartz, 20% clays), which are not readily dissolved by acids commonly used in the acid fracturing of carbonate formations. Typically, sandstone formations typically have a clay content of no more than 35% by weight. Typically minerals found in sandstone formations include quartz, feldspars, micas, clays (e.g. chlorite, kaolonite, illite, smectite), carbonates, sulfates, halites, iron oxides, etc.

In this application an aqueous solution containing a hydrogen fluoride (HF) source, ammonium hydroxide and a polycarboxylate formed from hydrolysis of polyimide derivative on the surface is formed for introducing into the sandstone formation. The polyimide polyimide-hydrolysis-product (polycarboxylate) provides an HF-compatible scale inhibitor. When solid-form polyimide is used, the polyimide may initially be mixed at the surface with a sufficient amount of ammonium hydroxide. The ammonium hydroxide hydrolyzes the solid polymer to form water-soluble polycarboxylic acid, which is in the carboxylate form with ammonium as the counterion. Additionally, the ammonium counterions are known to be compatible with HF, because they do not form insoluble precipitates during acidizing, such as with potassium or sodium cations. The resulting polycarboxylic acid may then be mixed with a conventional sandstone acidizing or acid fracturing fluids. Alternatively, a polycarboxylate, such as polyaspartate or copolymers based on polyaspartate, may be directly be combined with the sandstone acidizing fluids, without requiring the polyimide or polysuccinimide to be converted to polycarboxylic acid. Such treatment fluids eliminate the need for phosphonate scale inhibitors, which are sometimes used in conjunction with HF-containing treatment fluids.

In this application, the polyimide or polycarboxylate may be used in solid or non-solid form, wherein the polyimide or polycarboxylate are dispersed in water or an aqueous treatment fluid at the surface prior to introduction into the formation. The amount of polyimide or polysuccinimide and/or polycarboxylate used in this application may vary upon the job design. Typically, these materials will be present within the sandstone dissolving treatment fluid in an amount of about 15% or less by weight of the treatment fluid, more typically from about 1 to about 10% by weight of the treatment fluid.

The sandstone acidizing fluid with which the polyimide and/or polycarboxylate is used contains a sandstone-dissolving material. The sandstone-dissolving material is typically a material that provides a source of hydrogen fluoride (HF), which etches the sandstone formation upon its release. Typically, the source of hydrogen fluoride is ammonium bifluoride, although others sources of hydrogen fluoride may be used, such as ammonium fluoride and hydrofluoric acid. When the hydrogen fluoride source is ammonium bifluoride, it may be present in the final slurry in an amount between about 1% and about 5% by weight, more particularly between about 1% and about 3% by weight, and still more particularly between about 1% and about 2.5% by weight. When the hydrogen fluoride source is ammonium fluoride, greater amounts may be used. For ammonium fluoride, it may be present in the final slurry in an amount between about 2% and about 6% by weight, more particularly between about 2% and about 5% by weight, and still more particularly between about 3% and about 4.5% by weight.

Other sources of hydrogen fluoride may be used as well. Examples of other hydrogen fluoride sources are fluoroboric acid, hexafluorophosphoric acid, difluorophosphoric acid, fluorosulfonic acid, polyvinylammonium fluoride, polyvinylpyridinium fluoride, pyridinium fluoride, imidazolium fluoride, sodium tetrafluoroborate, ammonium tetrafluoroborate, salts of hexafluoroantimony, polytetrafluoroethylene polymers (e.g. TEFLON®), and combinations of these.

In most cases, the hydrogen fluoride source is combined with an acid-based fluid. The acid-based fluid may be an aqueous fluid that is acidized with non-HF acids. This may include mixtures of different acids. Such mixtures or solutions employing hydrofluoric acid and at least one other acid are commonly referred to as "mud acids" and are well known to those skilled in the art. The non-HF acids used may include, but are not limited to, hydrochloric acid, hydroiodic acid, hydrobromic acid, sulfuric acid, sulfamic acid, phosphoric acid, formic acid, acetic acid, halogenated derivatives of acetic acid, citric acid, propionic acid, tartaric acid, lactic acid, glycolic acid, aminopolycarboxylic acids, sulfamic acid, phosphonate acids and esters thereof, malic acid, maleic acid, methylsulfamic acid, chloroacetic acid, 3-hydroxypropionic acid, polyaminopolycarboxylic acid derivatives, polycarboxylic acid derivatives, bisulfate salts and combinations of these and/or their salts.

The acids may be used in an amount to provide a pH of about 4 or less once injected into the formation. The initial pH at the surface may be higher than the pH of fluid after it is introduced into the formation. Lower pH may be achieved subsequent to introduction of the slurry into the formation due to higher temperatures.

Chelating agents may also be added with the sandstone-dissolving treatment fluid to prevent undesired precipitation of various materials with metal ions resulting from the reaction of the hydrofluoric acid with the formation in an amount of from about 10% to about 40% by weight of the treatment fluid. Typical chelating agents may include citric acid, polycarboxylates, or polyaminopolycarboxylic acids, for example hydroxyethylethylenediamine triacetic acid (HEDTA), ethylenediamine tetraacetic acid (EDTA), diethylenetriamine pentaacetic acid (DTPA), hydroxyethylimino diacetic acid (HEIDA), and salts of these acids and mixtures of these acids and/or salts.

Corrosion inhibitors may also be added to the sandstone-dissolving treatment fluids. Conventional corrosion inhibitors may be used as long as they are compatible with chemicals present in, or generated during use by, the slurry. Compounds containing ammonium quaternary moieties and sulfur compounds may be suitable (see for example U.S. Pat. No. 6,521,028, which is herein incorporated by reference).

Other additives commonly used in oilfield treatment fluids, such as friction reducers, clay control additives, wetting agents, fluid loss additives, emulsifiers, agents to prevent the formation of emulsions, iron control agents, hydrogen-sulfide-scavengers, and other additives well known to those skilled in the art may be added to the treatment fluid. It is to be understood that whenever any additives are included in any of the treatments discussed herein, laboratory tests may be performed to ensure that the additives do not affect the performance of the fluid.

In certain applications viscoelastic surfactants (VES) may be used, such as for self-diversion of the treating fluid. The use of such VES in a self-diverting application is described in U.S. Pat. No. 7,237,608.

The product formed by the polyimide and/or polycarboxylate used with the sandstone-dissolving treating fluid provides an HF-compatible scale inhibitor. Many polycarboxylates have sodium or potassium counterions that form precipitates downhole in the presence of HF. Because only ammonium counterions exist in the treatment fluid no such precipitates are formed in the present application. The polyimide-produced polycarboxylate with ammonium counterion also facilitates metal chelation in solution and may be useful as a dispersant of amorphous silica or calcium fluoride. In the case of polyaspartates formed from polysuccinimide hydrolysis, the material is further biodegradable to its monomeric acids, making it environmentally friendly.

The following examples serve to further illustrate the invention.

EXAMPLES

The following examples illustrates the ability of polyimide particles to divert treatment fluids for injection into porous media, including diversion of matrix acidizing fluids through coreflood experiments. Berea sandstone cores were confined under pressure at temperature and a treatment fluid candidate were injected through the core. The permeability to 5 wt % $NH_4Cl$ (aq) brine were measured to steady state values ($\pm 10\%$) in both the injection (downward) and production (upward) directions before ($k_{ini}$) and after ($k_{fin}$) treatment.

The polyimide particles generate resistance to flow for the carrier fluid, seen in an increase in differential pressure during the treatment phase. According to Darcy's law, seen below in equation (2), increased differential pressure ($\Delta P$) leads to a decrease in the effective permeability to the carrier fluid during its injection (from a resistance in flow through the core being treated):

$$k = \frac{QL\mu}{A\Delta P} \quad (2)$$

where the permeability (k) is dependent on the cross-sectional area (A), rate of fluid flow (Q), fluid viscosity ($\mu_t$), length of porous core (L) through which flow occurs, and pressure drop across the core ($\Delta P$).

In a field scenario, a fluid showing effective differential-pressure generation would likely be able to equilibrate flow through cores of dissimilar initial permeability, diverting fluid from the core with the high initial-permeability to the lower-permeability core. An additional measure of the effectiveness of a diverter additive is the regained-permeability after treatment, quantifying the ability to clean up the residual diverter particulate when the core is put back on production. Some degradable diverters require a shut-in period at temperature in order to encourage their breakdown. Effective diverters for matrix acidizing fluids may leave minimal residual damage after injection and/or shut-in in order to maximize the benefits of a stimulation treatment.

Example 1

The particle size distribution of a powdered form of polysuccinimide (available as Baypure DSP, from Lanxess Corporation) was measured using a Malvern Mastersizer 2000 particle analyzer (Malvern Instruments, Malvern, Worcs., UK). Deionized water was circulated through the Malvern Mastersizer throughout the measurement and <0.1 grams of the powdered polymer, insoluble in water at neutral pH, was slowly added. The surfactant powder was dispersed into the water by constant circulation of the polysuccinimide/water dispersion. The particle size distributions were obtained from an average of three separate measurements. The Mastersizer was cleaned thoroughly with several washes of deionized water before and after each measurement.

Figure 1:
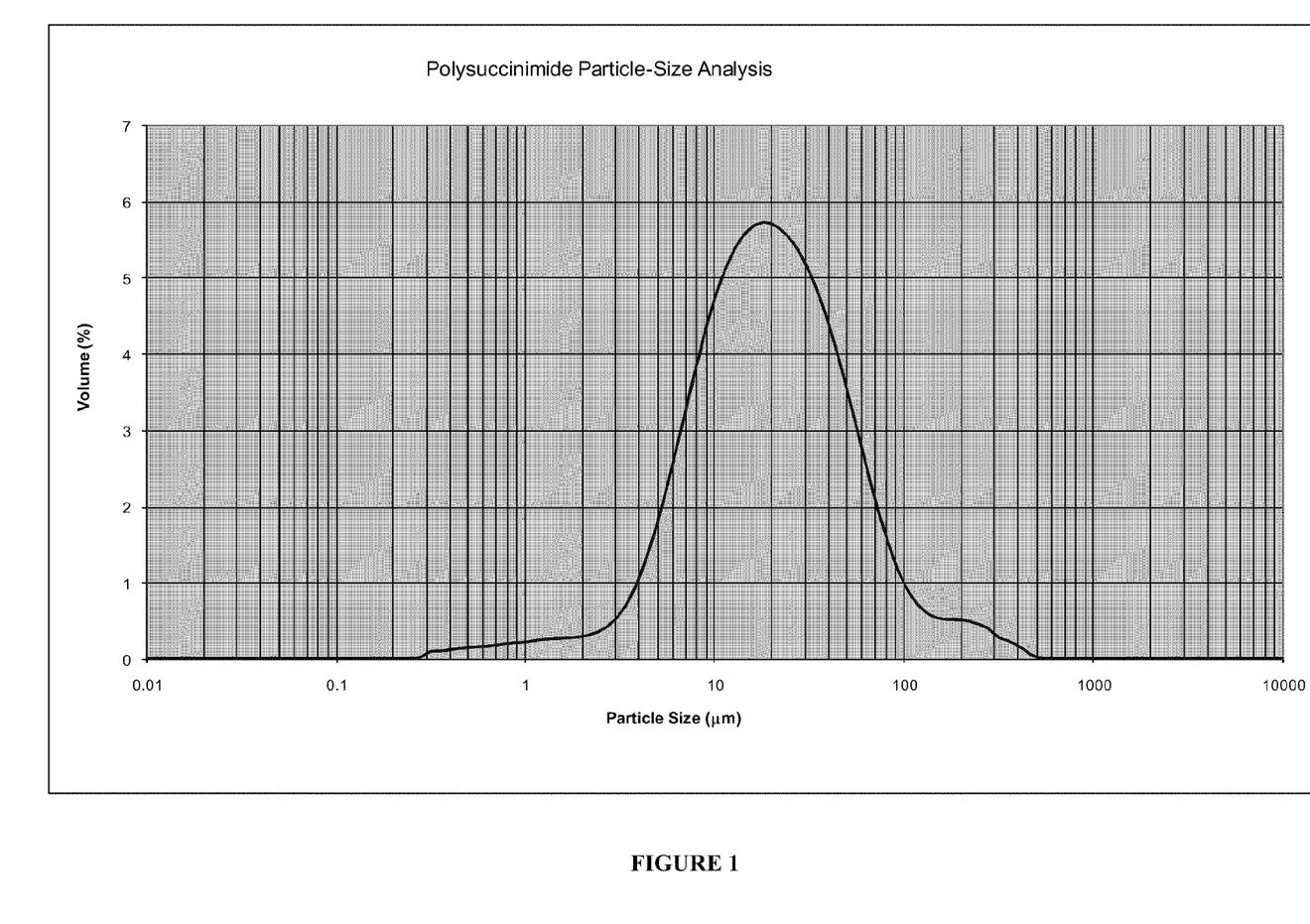
FIG. 1 shows a plot of the particle size distribution of polysuccinimide particles for Examples 1-4.

FIG. 1 shows the particle size distribution of a sample of polysuccinimide (as supplied). According to FIG. 1, the size of the polymer particulates ranged from roughly 0.2-500 microns. The d(0.5) value for the sample is 20.812 µm, with corresponding d(0.1) and d(0.9) values of 0.474 and 54.390 µm, respectively. A comparison of this mean diameter (roughly 20 mm) can be made to an estimation of the dimensions of the average pore-throat size, to determine if these particles might provide effective for differential-pressure generation for diversion applications. Several models have tried to estimate the pore throat size distribution. One such equation (The Winland Equation, published by Kolodzie in 1980) relates porosity, permeability, and pore aperture according to Equation 3:

$$\log(R35)=0.732+0.588 \log(k_{air})-0.864 \log \phi \quad (3)$$

where R35 is the pore aperture radius (µm) corresponding to the $35^{th}$ percentile, $k_{air}$ is the permeability to air (mD), and $\phi$ measures the porosity. The batch of Berea-Buff sandstone cores used in Example 2 discussed below typically displayed permeabilities (to 5 wt % $NH_4Cl$) of 100-200 mD. Using a permeability of 100 mD, cores with porosities of 10 and 15% show R35 values of 11.07 and 7.80 µm, respectively (leading to pore-throat diameters between roughly 15-22 µm). Therefore, a dispersion of this batch of polysuccinimide particles could foreseeably create a temporary diverter barrier across the formation face.

Example 2

Coreflood experiments were carried out using Berea-Buff sandstone cores 6 inches (15.24 cm) long and 1 inch (2.54 cm) in diameter in a Formation Response Tester Instrument. The core dimensions were accurately measured and dry core-mass was measured. The cores were saturated in a 5 wt % solution of ammonium chloride prior to testing, and the saturated mass was used to calculate the pore-volume. The cores were tested at 200° F. (93.3° C.) under a confining pressure of 2000 psi (13.8 MPa) in a Viton sleeve. A backpressure of 500 psi (3.45 MPa) was used throughout the experiment to keep $CO_2$ in solution, allowing accurate measurement of the differential pressure (top to bottom) across the core. After the brine-saturated core had reached steady-state temperature, the initial permeability to 5% $NH_4Cl$ brine ($k_{ini}$) was measured separately in the production and injection directions. All brine and treatment-fluid injections were carried out using flow-rates of 5 cm$^3$/min. The treatment fluid consisted of a solution of polysuccinimide (Baypure DSP, Lanxess) in calcium chloride brine (with a density of 1.25 g/cm$^3$). Following the treatment stage, the return permeability to 5 wt % $NH_4Cl$ was measured in the injection directions to determine the final permeability ($k_{fin}$). This stage was optionally followed by either measurement of permeability in the production direction or was shut-in at temperature followed by measurement of brine-permeability in the injection and production directions.

The first coreflood testing was carried out with a sample of polysuccinimide (Baypure DSP, Lanxess) with a particle size d(50)=20.812 µm (Example 1). The treatment stage consisted of 10 wt % polysuccinimide in 1.25 g/cm$^3$ $CaCl_2$ (aq). In this experiment, heavy brine was chosen as the carrier fluid for several reasons. First, through its higher density, it maintained a stable dispersion of the polysuccinimide particles for the longest period of time. Secondly, although fluids used in matrix acidizing could technologically be used as carrier fluids for applications using the particulates to divert flow, acidizing fluids are effective in the stimulation of core permeabilities through the dissolution of damage. Therefore, since diverter particulates generate temporary permeability damage (resistance to flow) and acid fluids stimulate core permeabilities, it may be difficult to decouple the two effects to estimate any residual damage to the core (permeability) from polysuccinimide.

Figure 2:
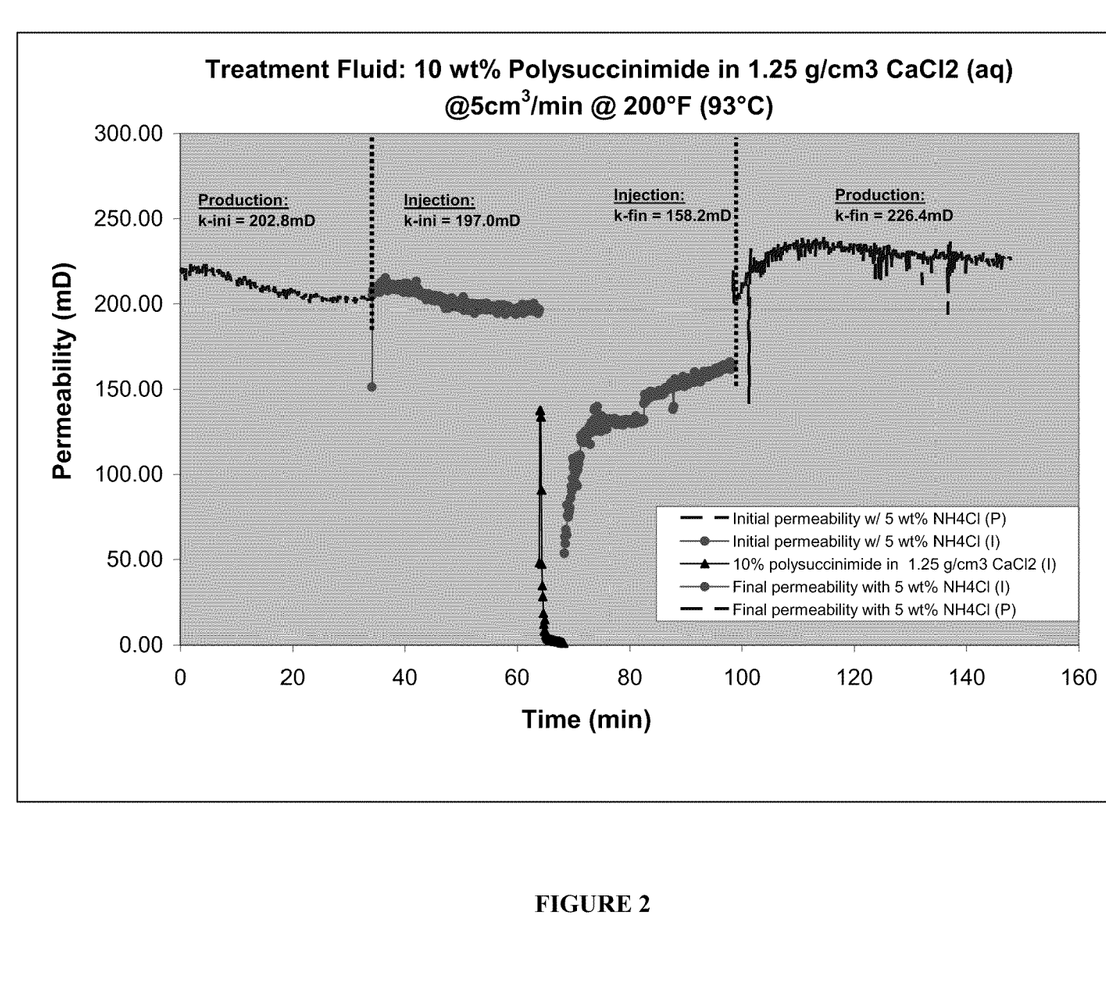
FIG. 2 shows a plot of the permeability of a Berea-Buff core sample before and after treatment with a 10 wt % polysuccinimide treatment fluid of Example 2.

As seen in FIG. 2, the permeability measurements at 5 wt % $NH_4Cl$ in the production and injection directions were carried out at 202.8 mD and 197.0 mD, respectively, before the treatment stage. In the tests displayed in FIG. 2, it was intended to pump 10 pore-volumes of 10 wt % polysuccinimide in 1.25 g/cm$^3$ $CaCl_2$ (aq)into the core (where 1 pore-volume was measured as 16.5 g) followed by measurements of the final permeability after treatment without a preceding shut-in period. The significant amount of pressure that was generated from the polysuccinimide additive, however, allowed only roughly 1.3 pore-volumes to be injected into the core before reaching the experimental limitation.

Figure 3:
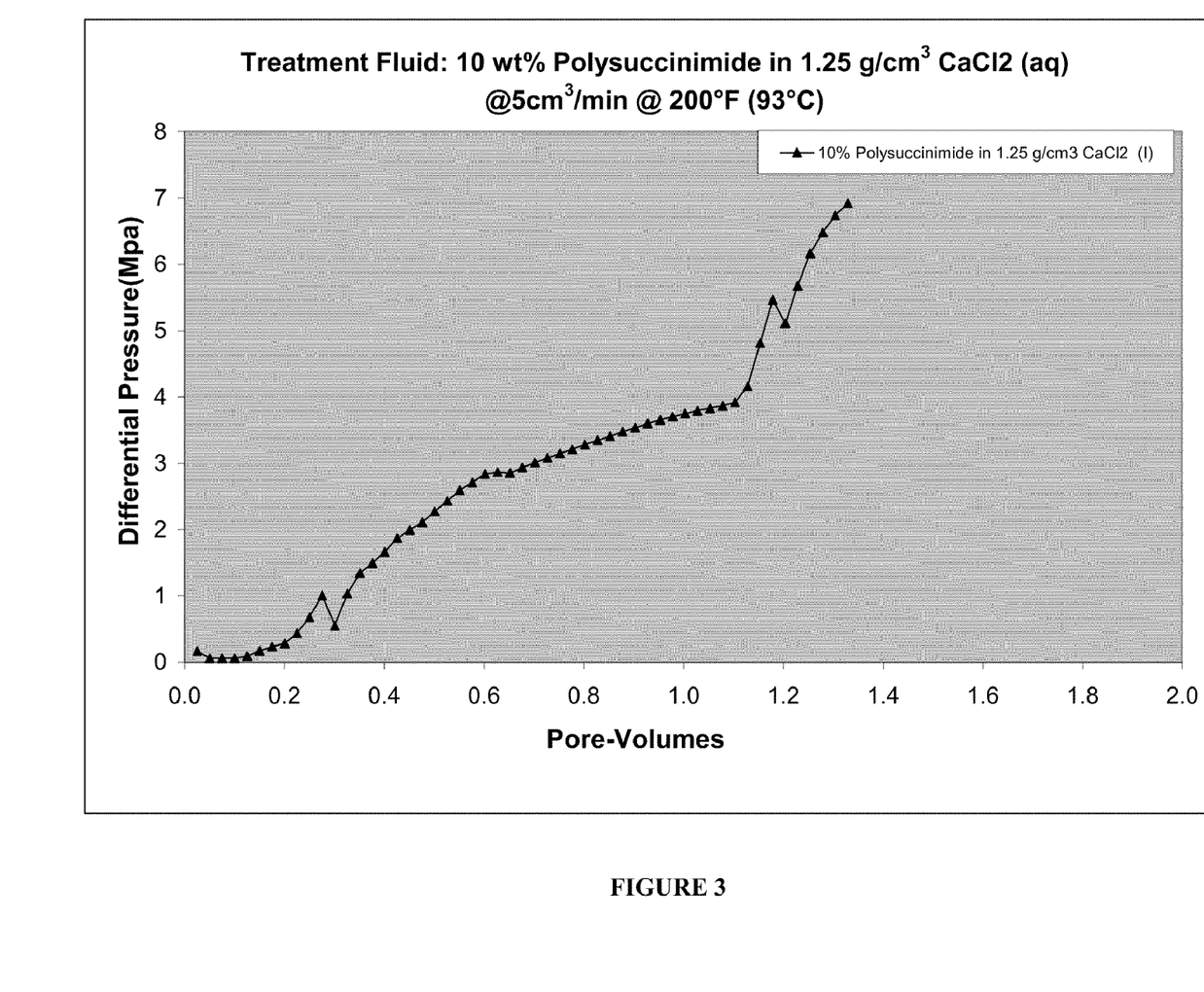
FIG. 3 shows a plot of the differential pressure versus pore volumes of treatment fluid generated during the treatment of Example 2.

The differential pressure (mPa) generated during the treatment stage is plotted in FIG. 3 versus the number of pore-volumes. The experiment was instrument-limited by the confining pressure applied around the core and the back pressure. All attempts were made to maintain [differential pressure]+ [back pressure]<[confining pressure] by at least 2.07-3.45 MPa. However, the pressure generation, as shown in FIG. 3, could easily lead to the ability to divert the carrier fluid. In this case, the carrier fluid was a brine solution. This example shows that comparable treatment-fluid diversion using, for example, acidizing fluids as the carrier fluid is technologically feasible.

This test also showed regained permeability values even without a shut-in at temperature. For example, the k-fin in the production direction (226.4 mD) is slightly higher than the k-ini value for this core (202.8 mD), indicating that there is no persistent damage to the core permeability from invasion of the polysuccinimide particulates.

Example 3

Despite the positive results from this coreflood experiment of Example 2 at 10 wt % loading, this is an extreme high concentration of particulate diverter. In field-scenarios, the amount of solid particulates for fluid-diversion may be lower. Therefore, a comparable test to that shown above in Example 2 was carried out using 1 wt % polysuccinimide in a carrier fluid of 1.25 g/cm$^3$ $CaCl_2$ (aq). The initial permeability to 5 wt % $NH_4Cl$ in the production and injection directions, displayed in FIG. 4, was at 166.2 and 167.9 mD, respectively, which is similar to those of Example 2. The lower concentration of polysuccinimide allowed more pore-volumes of treatment fluid to be injected before reaching an instrument-limited number of pore-volumes.

Example 4

Figure 4:
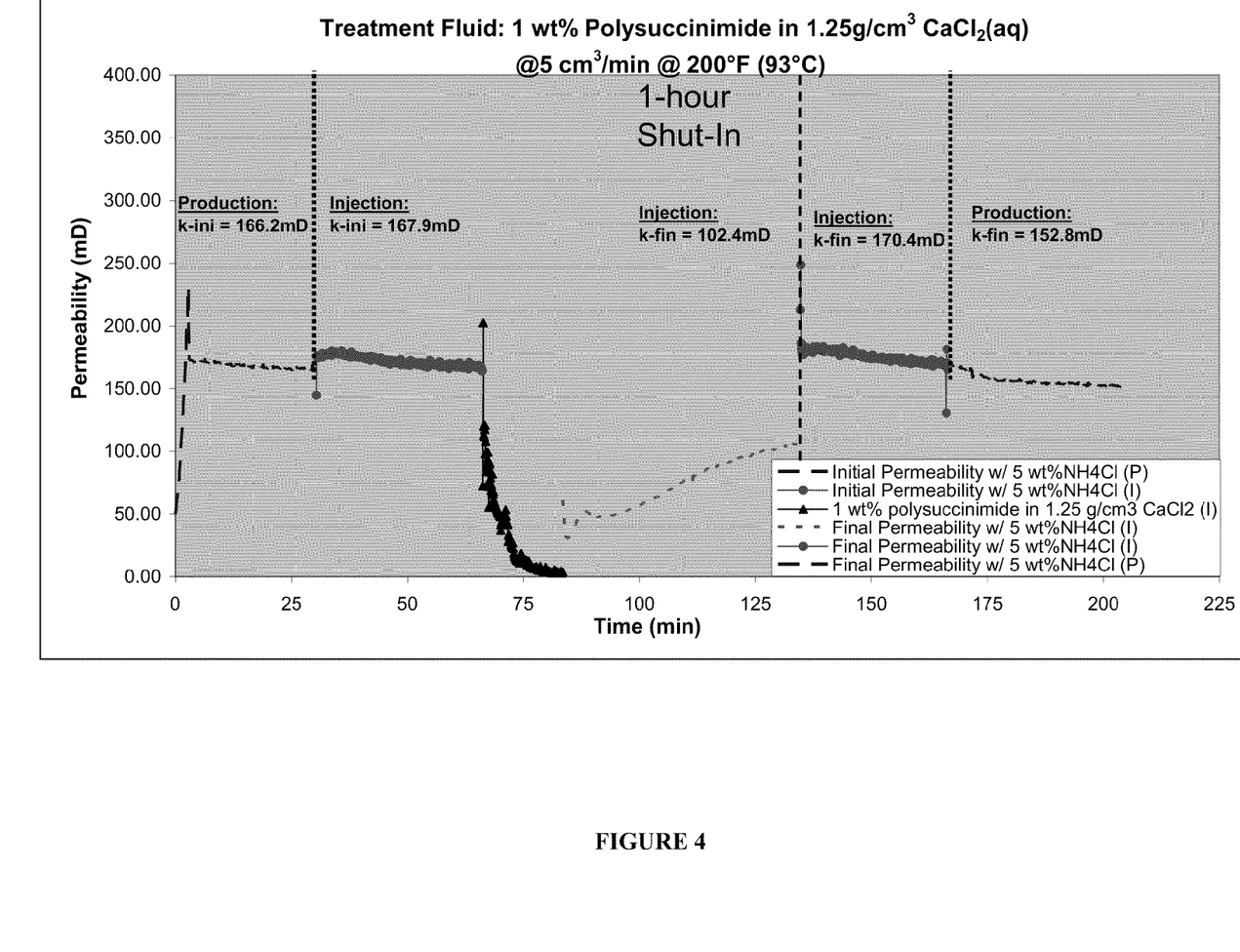
FIG. 4 shows a plot of the permeability of a Berea-Buff core sample before and after treatment with a 1 wt % polysuccinimide treatment fluid of Example 3.
Figure 5:
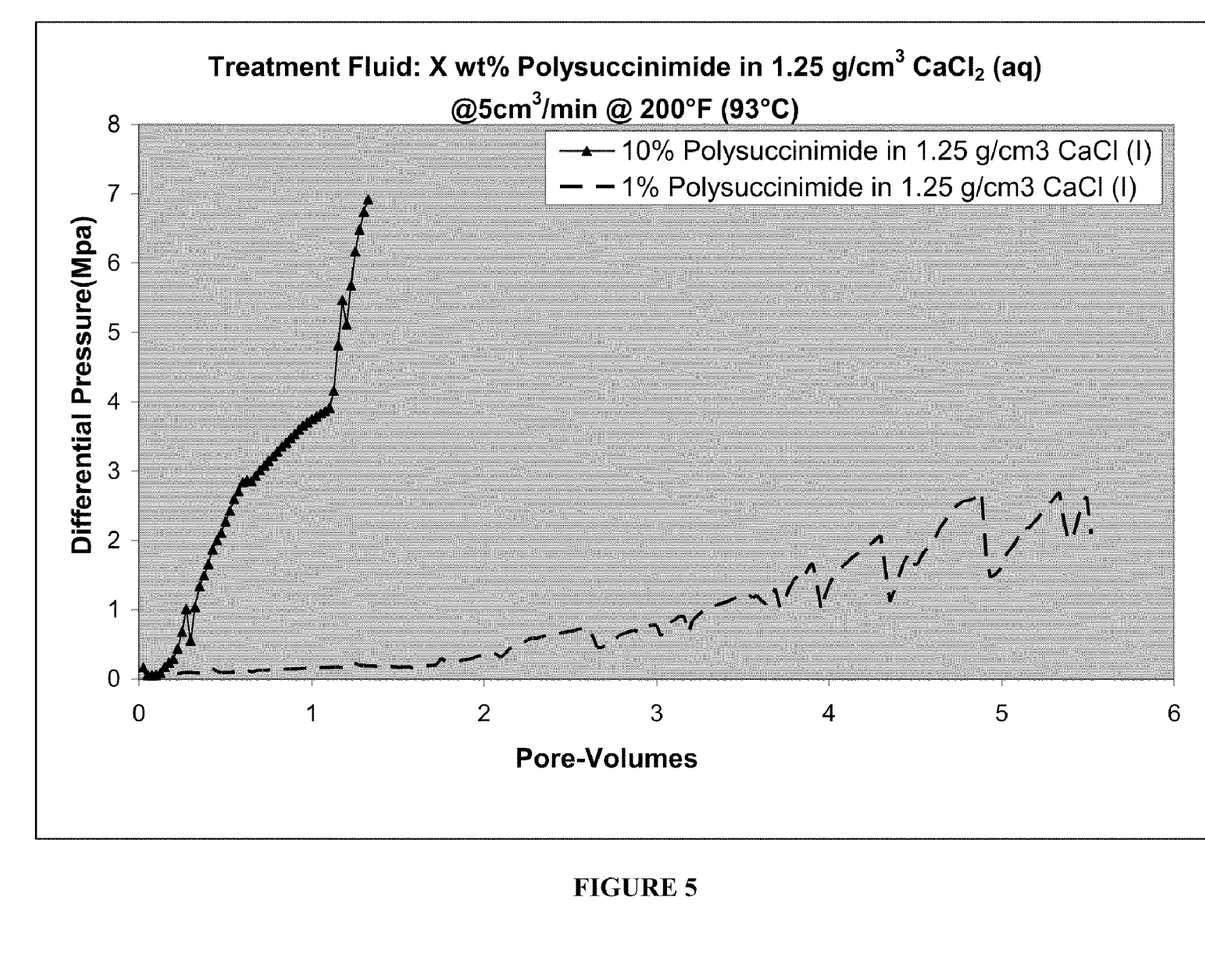
FIG. 5 shows a plot of the differential pressure versus pore volumes of treatment fluid generated during the treatments of Examples 2 and 3.

The fluids from Examples 2 and 3 were compared. FIG. 5 shows a plot of the differential pressure generated during the experiments using both 1 wt % (Example 3) and 10 wt % polysuccinimide (Example 2) in 1.25 g/cm$^3$ $CaCl_2$ (aq) versus the number of pore-volumes (one pore volume=15.7 and 16.5 grams, respectively). The fluid of Example 3 using 1 wt % polysuccinimide showed a steady increase in differential pressure during the treatment phase. This may be recognized as the steady build-up of a filter-cake on the core face toward diversion of the carrier fluid. As seen in FIG. 4, the permeability recovery in the injection direction is similar to that seen in FIG. 2 (using higher loading of polysuccinimide). After the final permeability (k-fin) was measured for a period of time in FIG. 4, however, a shut-in (no flow through core) was carried out for one hour at 200° F. (93.3° C.) before commencing the measurement of the final permeability again. The k-fin values in the production and injection directions are 152.8 and 170.4 mD, respectively, indicating an efficient cleanup of any residual diverter additives with shut-in at this temperature. Again, the diversion (FIG. 5) and permeability-cleanup (FIGS. 2 and 4) indicate that the use of polysuccinimide at a variety of loading values is an efficient means of diversion of a carrier fluid and cleans up efficiently from the matrix (permeability). This shows that no prolonged damage to the core-permeability results from the treatment. Similar diversion of other carrier fluids is technologically feasible using polysuccinimide particulates and similar materials and under similar conditions. Matrix cleanup is also facilitated.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of treating a subterranean formation penetrated by a wellbore, the method comprising:
   a. forming a treatment fluid comprising an aqueous carrier fluid, a proppant and a water-insoluble solid-form polyimide homopolymer or copolymer capable of hydrolyzing to form polycarboxylates and/or polycarboxylic acids;
   b. introducing the treatment fluid into the formation through the wellbore;
   c. allowing the polyimide to hydrolyze over time and become water-soluble; and
   d. providing scale inhibition over time in formation and within proppant.

2. The method of claim 1, wherein:
   the polyimide has a particle size of about 0.15 mm or less.

3. The method of claim 1, wherein:
   the treatment fluid further comprises a viscosifying agent.

4. The method of claim 1, wherein:
   the polyimide is a homopolymer or copolymer with all or a portion of such homopolymer or copolymer selected from at least one of polysuccinimide, polymaleimide, poly(aspartic acid), polyaspartate, poly(amino acids), poly(ethylene glycol), poly(propylene glycol), and N-derivatized polyaspartamide, and wherein the copolymer includes block or random copolymers with portions of at least two of the monomer units of succinimide, maleimide, aspartate, aspartic acid, glutamic acid, asparagine, glutamine, lysine, arginine, alanine, valine, serine, threonine, and other amino acids and their salts therof.

5. The method of claim 1, wherein:
   the polyimide is in the form of at least one of particles, fibers, beads, films, ribbons, rods, elongated bodies and platelets.

6. The method of claim 1, wherein:
   the treatment fluid is introduced into the formation at a pressure above the fracture pressure of the formation.

7. The method of claim 1, wherein:
   the treatment fluid further comprises a formation-dissolving agent capable of dissolving materials of the formation.

8. The method of claim 1, wherein:
   at least one of the treatment fluid and a postflush fluid introduced after the treatment fluid has a pH of about 4 or more.

9. The method of claim 1, wherein:
   the polyimide is present within the treatment fluid in an amount of from about 20% by weight or less.

10. The method of claim 1, wherein:
    the treatment fluid contains substantially no fatty acids or fatty acid derivatives.

11. A method of treating a subterranean formation penetrated by a wellbore, the method comprising:
    a. forming a treatment fluid comprising an aqueous carrier fluid, a water-insoluble solid-form polysuccinimide homopolymer or copolymer and at least one of a viscosifying agent, proppant and an acid capable of dissolving materials of the formation;
    b. introducing the treatment fluid into the formation through the wellbore;
    c. allowing the polyimide to hydrolyze over time and become water-soluble; and
    d. providing scale inhibition over time in formation and within proppant.

12. The method of claim 11, wherein:
    the solid-form polyimide has a particle size of about 0.15 mm or less.

13. The method of claim 11, wherein:
    the treatment fluid is introduced into the formation at a pressure below the fracture pressure of the formation.

14. The method of claim 11, wherein:
    the polyimide is in the form of at least one of particles, fibers, beads, films, ribbons, rods, elongated bodies and platelets.

15. The method of claim 11, wherein:
    the treatment fluid is introduced into the formation at a pressure above the fracture pressure of the formation.

16. The method of claim 11, wherein:
    the treatment fluid further comprises a formation-dissolving agent capable of dissolving materials of the formation.

17. The method of claim 11, wherein:
    the treatment fluid further comprises hydrochloric acid, hydrofluoric acid, sources of hydrogen fluoride, fluoboric acid, boric acid, nitric acid, hydroiodic acid, hydrobromic acid, sulfuric acid, sulfamic acid, phosphoric acid, formic acid, acetic acid, halogenated derivatives of acetic acid, citric acid, propionic acid, tartaric acid, lactic acid, glycolic acid, aminopolycarboxylic acids, sulfamic acid, phosphonate acids and esters thereof, malic acid, maleic acid, methylsulfamic acid, methanesulfonic acid, chloroacetic acid, 3-hydroxypropionic acid, polyaminopolycarboxylic acid derivatives, polycarboxylate derivatives, and combinations of these acids and/or their salts.

18. The method of claim 11, wherein:
    at least one of the treatment fluid and a postflush fluid introduced after the treatment fluid has a pH of about 4 or more.

19. A method of treating a sandstone-containing formation penetrated by a wellbore, the method comprising:
    forming a treatment fluid comprising an aqueous solution containing a hydrogen fluoride source, ammonium hydroxide and at least one of a polyimide and a polycarboxylate;
    wherein the ammonium hydroxide and the polyimide are mixed together prior to addition of the hydrogen fluoride source to facilitate degradation of the polyimide to form an aqueous polycarboxylate solution, the treatment fluid comprising the aqueous polycarboxylate solution and the hydrogen fluoride source; and
    introducing the treatment fluid into the formation through the wellbore.

20. The method of claim 19, wherein:
    the polyimide is a homopolymer or copolymer with all or a portion of such homopolymer or copolymer selected from at least one of polysuccinimide, polymaleimide, poly(aspartic acid), polyaspartate, poly(amino acids), poly(ethylene glycol), poly(propylene glycol), and N-derivatized polyaspartamide, and wherein the copolymer includes block or random copolymers with portions of at least two of the monomer units of succinimide, maleimide, aspartate, aspartic acid, glutamic acid, asparagine, glutamine, lysine, arginine, alanine, valine, serine, threonine, and other amino acids and their salts therof.

21. The method of claim 19, wherein:

the hydrogen fluoride source is selected from hydrofluoric acid, ammonium fluoride, ammonium bifluoride, fluoroboric acid, hexafluorophosphoric acid, difluorophosphoric acid, fluorosulfonic acid, polyvinylammonium fluoride, polyvinylpyridinium fluoride, pyridinium fluoride, imidazolium fluoride, sodium tetrafluoroborate, ammonium tetrafluoroborate, salts of hexafluoroantimony, polytetrafluoroethylene polymers, and combinations of these.

22. The method of claim 19, wherein:

the treatment fluid further comprises hydrochloric acid, nitric acid, hydroiodic acid, hydrobromic acid, sulfuric acid, sulfamic acid, phosphoric acid, formic acid, acetic acid, halogenated derivatives of acetic acid, citric acid, propionic acid, tartaric acid, lactic acid, glycolic acid, aminopolycarboxylic acids, sulfamic acid, phosphonate acids and esters thereof, malic acid, maleic acid, methylsulfamic acid, methanesulfonic acid, chloroacetic acid, 3-hydroxypropionic acid, polyaminopolycarboxylic acid derivatives, polycarboxylate derivatives, and combinations of these acids and/or their salts.

* * * * *